United States Patent Office
3,471,434
Patented Oct. 7, 1969

3,471,434
ROOM TEMPERATURE CURING ORGANOPOLY-
SILOXANE ELASTOMERS
Kailash Chandra Pande, Adrian, and Guenther Fritz Leng-
nick, Manitou Beach, Mich., assignors to Stauffer
Chemical Company, New York, N.Y., a corporation
of Delaware
No Drawing. Filed Dec. 27, 1965, Ser. No. 530,746
Int. Cl. C08g 47/02, 51/62
U.S. Cl. 260—37
10 Claims

ABSTRACT OF THE DISCLOSURE

Certain oximohydrocarbonoxy-substituted organopoly-siloxanes are presented as novel compounds and their use in room temperature vulcanizing compositions demonstrated.

---

This invention relates to preparations of essentially paste-like consistency which upon exposure to atmospheric moisture at normal temperatures become converted to a solid elastic state.

Such preparations are referred to in the art as room temperature vulcanizing (RTV) compositions and find utility, for example, in mold making, in coating operations and in the construction industry for caulking. They are commonly laid down as from a pot or a specially designed tube.

In general, preparations of the type herein fall into two categories. In the one case, the commercial package comprises two containers, one for the base composition, the other containing a catalyst which must be admixed with the base material to induce proper curing of the latter. Preparations of the second category do not require addition of a catalyst, which is to say that they are self-curing.

Compositions conforming to the present invention are unique in relation to the prior art since they enable a one-package system which may include a catalyst. These compositions are distinguished in that they comprise as the moisture activated component a novel organopolysiloxane material according with the formula

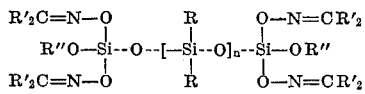

in which $n$ is an integer sufficient to yield a viscosity of from about 500 to about 500,000 centipoises, R is a monovalent hydrocarbon radical, preferably methyl, a halogenated monovalent hydrocarbon radical or a cyanoalkyl radical, R' is H, aryl, or an alkyl, halo-alkyl or cyano-alkyl radical of not more than four carbon atoms and R" is a saturated or unsaturated monovalent hydrocarbon radical which may be halo- or cyano-substituted. As exemplary of R" may be mentioned aliphatic radicals as methyl, ethyl, propyl, etc.; aromatic radicals as phenyl, chlorophenyl; alkaryl radicals as benzyl, cyanobenzyl; alicyclic radicals as cyclohexyl; alkenyl radicals as vinyl, butenyl, etc.

In the practice of the invention, the -oxy, ketoximo-substituted organopolysiloxane is generally prepared by reacting an hydroxy end-blocked organopolysiloxane fluid of suitable viscosity with the product obtained by reacting an organooxytrihalosilane and a ketoxime or aldoxime meeting the limits of the type formula supra in point of R' and R" which are derived from the organooxytrihalosilane and the oxime respectively.

The latter reaction can be carried out using only the reactants or it may be effected, usually with advantage, in the presence of a solvent such as benzene, xylene, toluene, heptane, chloroform, carbon tetrachloride or the like. It is also generally advantageous to add a basic material, preferably a nitrogenous compound, such as pyridine, α-picoline, trihexylamine, triethylamine, tris(2-ethylbenzyl-amine), etc. The reaction in any case may be hastened through the use of elevated temperatures, for example, the reflux temperature of the solvent, if such is employed. Normally a base is selected which permits precipitation and therefore ready separation by filtration of the base-hydrochloride formed as a product of the reaction. Following the filtration the solvent, if one is employed, may be removed by evaporation at atmospheric pressure and elevated temperatures or under reduced pressure at lower temperatures. Subsequently, the product can be distilled, if desired, although it is normally of sufficient purity that such step may be omitted.

The several reactions involved when the organopolysiloxane material is prepared as above described may be illustrated thus:

(a) 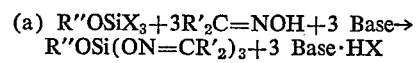
R"OSi(ON=CR'$_2$)$_3$+3 Base·HX where X is a halogen (b)

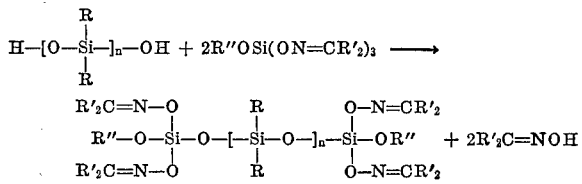

The latter reaction has been substantiated by the isolation and identification of the corresponding ketoxime by-product.

As indicated by Equation (b) the reaction involving the hydroxy end-blocked organopolysiloxane fluid and the monohydrocarbonoxy-trioximosilane demands by theory the use of at least 2 moles of the silane, but as a matter of practice it has been found that in some cases acceptable results can be achieved using as little as 1.6 moles of the silane per mole of hydroxy end-blocked fluid. In general, however, it is preferable to use the silane in excess, i.e. 2.5 to 4 moles per mole of hydroxy fluid, 2.5 moles being preferred. This reaction, like reaction (a) is best carried out with application of heat (50–100° C.) and with constant stirring. An inert gas atmosphere e.g. nitrogen, is desirable to prevent premature moisture-activation of the reaction product with the consequent complications. Alternatively, an atmosphere of dessicated air can be used. Here the reaction is usually complete in about 2 hours.

Alternative methods for preparing the monocarbonoxy-trioximosilane are available. Thus, in lieu of the above described method, one may start with a silane tetrahalide, usually silane tetrachloride, this being reacted with one-half mole of a selected alcohol in an inert atmosphere. The resultant monohydrocarbonoxytrihalosilane is subsequently or simultaneously reacted with an excess of the aldoxime or ketoxime in the presence of the above-mentioned nitrogenous base to obtain a halogen-free monocarbonoxytrioximosilane.

On the basis of the results of a large number of experiments, an hydroxy end-blocked fluid in which the organo-substituents are methyl groups is preferred in the practice of the invention. As to the oximo substituents in the product material, acetoximo or diethylketoximo is preferred. The nature of the hydrocarbonoxy groups is largely a matter of the extent of the cure period desired or specified. Where a fairly fast cure is required, alkoxy groups containing no more than four carbon atoms e.g. methoxy, ethoxy, isopropoxy, t-butoxy, etc. are employed. As indicated, it has been found that as a general rule the higher the molecular weight of the hydrocarbonoxy group, the slower the cure. It has further been determined that branched chain groups tend toward a slower cure than their linear counterparts.

As suggested by the viscosity range previously recited for the hydroxy end-blocked organopolysiloxane material, the extent to which such material is polymerized varies widely. Thus $n$ in the type formula may have a value of as low as 5 (corresponding to a very thin fluid) or as high as 9,000 or more as obtains in the instance of extremely slow-flowing gums. Usually and preferably, the viscosity of the fluid lies within the range 1,500 to 200,000 cps. Mixtures of high and low viscosity hydroxy end-blocked fluids are, of course, applicable to the invention. Moreover, it should be understood that the hydroxy end-blocked fluid employed may represent either a homopolymer of similar siloxane units or a copolymer of dissimilar units.

In some instances, it may be desirable to modify composition conforming to the invention in order to achieve special properties. For example, to improve adhesiveness there may be incorporated in the composition a suitable amount of a resinous siloxane. In addition, these resinous siloxanes may be used to decrease the elasticity of the cured composition, which in some cases is a desideratum. Plasticization of the vulcanized compositions, where necessary or desirable, can be achieved using various materials, including trimethyl end-blocked dimethyl siloxanes.

Although the compositions herein can often be applied per se with good effect, they are of greatest commercial interest at present as applied in admixture with various fillers. These may be reinforcing or non-reinforcing, fibrous or non-fibrous. In general, substantially any of the fillers employed in the compounding of silicone rubbers may be used in the practice of the invention. As exemplary of reinforcing fillers may be mentioned: fumed silicas, high-surface area precipitated silicas, silica aerogels and the like. The coarser silicas, as diatomaceous earths and crushed quartz, are examples of non-reinforcing filler materials having application to the invention. In this connection, metallic oxides as titanium oxide, ferric oxide, zinc oxide, etc. also should be noted. Applicable fibrous fillers include asbestos and fibrous glass.

Considering the effect of moisture on the compositions herein, it is manifestly important that the filler material be dry before use for the purposes of the invention. The quantity of filler employed depends on the nature of the particular filler and the properties desired in the final product. In most cases where a filler is used, the same is applied in an amount representing about 5 to 100+ parts by weight per 100 parts of the organopolysiloxane material. When a filler with a very active surface is used, such as those termed commercially as "fumed" silicas, then the amount of filler is normally of low level, for example, 10 to 30 parts per 100 parts of the organopolysiloxane material. However, if the filler is relatively lacking in surface activity and hydrogen bonding on the filler surface is largely absent, as in the case with "precipitated" silicas, iron oxide and the like, then amounts of the filler falling in the higher portion of the range above recited, or even larger amounts, can be used. The exact filler ratio is in general, governed by the initial viscosity of the organopolysiloxane fluid, the final viscosity of the overall formulation and the properties desired in such formulation and the cured rubber.

Where the composition is to be used in caulking, care should be exercised to select a filler which will preclude any tendency of the composition to slump during application or thereafter. The term "slump," of course, refers to gravity-induced flow of such a material with resultant development of areas of non-uniform section.

Apart from fillers as before mentioned, compositions conforming to the invention may contain coloring agents, agents capable of preventing the passage of ultraviolet light, dessicants and antioxidants, for instance. Also, depending upon the use to which the composition is to be put, it may or may not be desirable or necessary to include a dielectric material, graphite for example.

As hereinbefore suggested, compositions conforming to the invention can be tailored to fit various specifications as to cure times. In caulking, for instance, the working time from the pot is more or less conventionally calculated as of the order of 2–2½ hours. Thus, to meet this requirement, the starting materials used in the preparation of the composition are so selected that substantial stiffening of the composition will not occur until after expiration of such period of time. Normally, the applied material is tack-free within ½ to 3 hours, is substantially cured after 24 hours and completely cured after 7 days. These periods, of course, vary somewhat as to any given composition with changes in humidity and also with changes in temperature. In general, the higher the temperature and humidity the faster the cure.

Although compositions conforming to the invention may be used without incorporation of a catalyst therein, the cure rate without a catalyst is too slow for some applications, hence a catalyst is usually included. That a catalyst may be applied in such a composition designed as a one-package system is, as previously noted herein, without precedence in the art.

By the use of a catalyst the time for achievement of a tack-free surface, which is the accepted measure of cure-time, can be reduced from several hours to a time or value anywhere between several hours and 5 to 10 minutes, depending on the type and concentration of catalyst.

Catalyst employed according to the invention can be chosen from a variety of compounds. Usually, however, the catalyst is selected from the tin-family of compounds and generally from the great abundance of organotin compounds e.g. di- or tri-alkyl, -aryl, -alkaryl, -cycloalkyl, trihaloalkyl, tris-cyanoalkyl or triaralkyl tin halides, alkoxides, carboxylates, hydroxides, oximes, isocyanates, thiocyanates, etc.

In general, the applicable tin compounds fall within the scope of the formula $R_nSnX_{4-n}$ where R is representative of the organic radicals above, X denotes halide or other functional groups such above cited and $n$ is 1, 2 or 3.

Some catalysts, of course, show a much greater activity than others. The use of stannous octoate, for example, results in a fast cure of the formulation but such catalyst has the disadvanage of becoming poisoned through prolonged storage time and is therefore not too suitable for commercial application. Similar effects have been noted when dibutyltin dimethoxide is employed. However, the catalyst described as the reaction products of organotin alkoxides and organisocyanates do not display this fault to any substantial extent, and they consequently comprise a preferred choice. Total absence of poisoning was found in the case of organotin carboxylates, that is those in which the R′ in the formula $R_4Sn(O_2CR')_{4-n}$ has a greater number of carbon atoms than six.

The concentration of the catalyst, as previously indicated, can be adjusted to obtain various cure-times. Thus, a two percent level, using a tin carboxylate of the category above, provides a cure-time to the tack-free state of about 10 minutes. In many cases, subject to the characteristics of the organopolysiloxane material and filler, cure-times of 10 minutes can be obtained even with a 0.75% catalyst level. For a cure-time of 90 minutes one might employ 0.05% for example.

Not only is the cure-time to the tack-free state speeded, but also the cure of the entire section of exposed composition is hastened through the use of a catalyst. Thus, a complete cure, which takes some 3–7 days without a catalyst may be effected in as little as 36 hours with a suitable catalyst applied in the right concentration.

The compositions herein, assuming proper packaging, show an excellent shelf-life, which is to say that they can be stored for prolonged periods of time without adverse effect.

Normally, the moisture activation of the composition as it is laid down occurs through the influence of the moisture in the ambient air at the work site, but extraneous water vapor may be supplied by any suitable means to hasten the cure where and when desirable. It would appear that the curing process proceeds with cross-linking of the dihydrocarbonoxy, tetraoximo-substituted organopolysiloxane polymer units as illustrated below:

I.

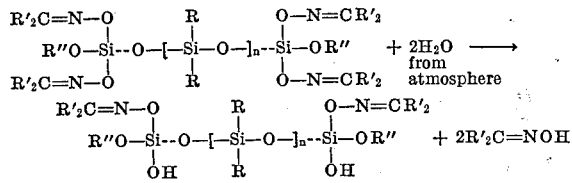

Evidence for this reaction is gained by the identification of the ketoxime by-product.

II.

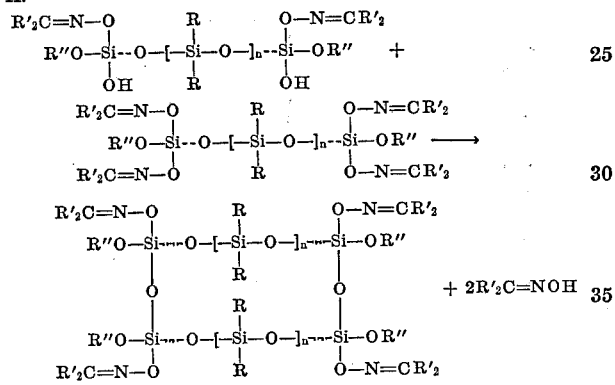

The cross-linked structure is, of course, subject to further cross-linking through hydrolysis of one or more of its oximo groups. Clearly, participation of the hydrocarbonoxy-group, i.e. R″O— in cross-linking is also possible and likely, but there seems little doubt that the oximo-substituent is responsible for the bulk of the cross-links.

The invention is further illustrated by the following examples which are not to be taken as in anyway limitative thereof:

EXAMPLE I

Silicon tetrachloride (255 grams) in dry ether (1,100 ml.) was charged to a 3-liter three-necked flask equipped with stirrer, addition funnel, condenser, therometer and gas inlet. An equimolecular amount of methanol in 400 ml. of ether was subsequently added via the addition funnel. The hydrochloric acid was removed and the product was distilled (B.P. 77–79°) to yield methoxytrichlorosilane.

To another flask of the above type was added methoxytrichlorosilane (165.5 grams), acetoxime (325 grams), dry benzene and pyridine (180 grams). The reaction mixture was refluxed for 1 hour. Thereafter, pyridine hydrochloride was filtered off and benzene was distilled from the filtrate to obtain methoxytriacetoximosilane (93% pure). N.M.R., I.R. and other analytical measures confirmed the structure of the product.

A portion of the above product corresponding to 0.00603 moles of

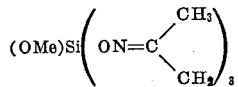

was added to 20 grams of an OH— end-blocked polysiloxane fluid of 55,000 cps. viscosity, whereafter the mixture was stirred and heated for 2 hours (at 65–70°) in a dry nitrogen atmosphere. The viscous material resulting from this reaction formed a tack-free rubbery surface within 1½ hous after exposure to normal atmospheric conditions. A ¼″ section was fully cured in 3 days. A sample placed in a collapsable tube did not show any cure in the tube whatsoever after a two month storage time, but when exposed, cured in the same manner.

EXAMPLE II

The secondary alcohol, iso-propanol was reacted in a one to one molar ratio with silicon tetrachloride in dry ether solution. The reaction product was finally distilled to yield pure isopropoxytrichlorosilane (B.P. 116–118°). This was then allowed to react with acetoxime in the molar ratio of 1:3 in the presence of pyridine. The reaction was carried out in the manner followed in the preparation of methoxytriacetoximo derivative. Pure isopropoxytriacetoximo silane was isolated. Its identity was established by N.M.R. spectroscopy, which indicated a purity of at least 98 percent.

This end-blocker was reacted with an OH-fluid of 55,000 c.p.s. viscosity, in the manner described previously. In this instance, the rubber composition required 8 hours to become tack-free. A ⅛″ section cured completely in about 7 days.

EXAMPLE III

Silicon tetrachloride (0.50 moles) in 300 ml. benzene was treated in an apparatus described in detail in Example I with an equimolar amount of isopropanol, the reaction mixture being kept at room temperature with vigorous stirring. As soon as addition of the alcohol was complete, 1.70 moles of acetoneoxime and 1.80 moles of pyridine were added as 50% benzene solutions. The reaction mixture was stirred at reflux for 1 hour, then the precipitated pyridine hydrochloride was filtered off and the solvent and excess reagents were vacuum stripped, leaving an end-blocker

of sufficient purity to give a well curing one-component RTV product.

EXAMPLE IV

The end-blocker i-C₃H₇OSi[ON=C(CH₃)₂]₃ as prepared in Example III was added to an hydroxy end-blocked dimethylpolysiloxane fluid of 2,800 cps. viscosity in a molar ratio of 2.5 moles end-blocker to 1 mole of fluid in the substantial absence of moisture, that is under a dry nitrogen atmosphere. Heating to 65–70° with stirring made the mixture homogeneous and hastened reaction. Acetoxime produce was removed in vacuo. The end-blocked organopolysiloxane material so obtained became tack-free in 8 hours when exposed to a constant humidity of 50% at a temperature of 75–80° F.

To a portion of the above uncured product there was added an amount equivalent to 3 weight percent of dibutyltinbutoxychloride. This catalyzed material cured to a tack-free state in 30 minutes. A ¼″ section cured completely overnight. After a 5 day storage time, in a tightly stoppered container, the catalyzed uncured material on exposure to ambient moisture cured within 60 minutes to the tack-free state.

EXAMPLE V 4.55 grams of the end-blocker

as prepared in Example II to a high state of purity, was reacted under standard end-blocking conditions with 100 grams of an OH-end-blocked fluid of 55,000 cps. viscosity. A catalyst (dibutyltindilaurate) level of 3 percent was used, the catalyst being added with vigorous stirring. When the mixture was exposed to the atmosphere, a tack-free skin formed within 8 minutes. A section ¼″ thick cured with 85 hours (50% humidity) to an elastomeric material. The uncured product was stored in a tightly stoppered collapsible tube and showed the same curing characteristic after a 28 day storage time. Again, only 8 minutes were required to form the tack-free surface at a 50% humidity level.

EXAMPLE VI

A procedure identical to that of Example V was followed, except the catalyst concentration (dibutyltindilaurate) was varied as follows, with the indicated effect on curing times to the tack-free state.

| Percent dibutyltindilaurate: | Tack-free time, min. |
|---|---|
| 3.00 | 8 |
| 1.50 | 15 |
| 0.75 | 20 |
| 0.40 | 30 |
| 0.20 | 115 |
| No catalyst | 480 |

Thus, the catalyst concentration is an inverse but not linear function of the curing time.

EXAMPLE VII

In a procedure identical to that of Example V, the following catalysts were checked for their activity at the 3% level, with results given below:

| Catalyst: | Tack-free time, min. |
|---|---|
| $Bu_2Sn[ON=C(CH_3)_2]_2$ | 60 |
| $Sn(O_2CC_7H_{15})_2$ | 15 |
| $Bu_2Sn(OME)_2$ | 30 |
| $BuSn[ON=C(CH_3)_2]_3$ | 80 |
| $PhN(CO_2Me)Sn(Bu_2)N(CO_2Me)Ph$ | 20 |
| $PhN(CO_2Me)Sn(OMe)(Bu_2)$ | 15 |
| Addition compound of toluene diisocyanate and $Bu_2Sn(OMe)_2$ | 7 |
| Addition compound of $Bu_3SnOBu$ and toluene diisocyanate | 15 |
| $Bu_2Sn(O_2CC_7H_{15})_2$ | 12 |
| $Bu_2Sn(O_2CCH_3)_2$ | 15 |
| $Bu_2Sn(OBu)_2$ | 40 |

EXAMPLE VIII

To 200 grams of hydroxy end-blocked fluid of 55,000 cps. viscosity were added 130 grams of a precipitated silica filler (Minusil) having a 5μ average particle size. The filler was blended into the fluid by making use of a Hobart rotary mixer which revolved at 120 r.p.m. After thorough dispersion, 10.3 ml. of the pure

$i\text{-}C_3H_7OSi[ON=C(CH_3)_2]_3$ end-blocker was added and the mixture was heated to 94° C. The entire operation was done under an atmosphere of dry nitrogen to prevent premature cure. Subsequently, 2% catalyst (dibutyltindilaurate) was added with stirring. Entrained air was removed in vacuo, leaving a thick pasty material. When a portion of such product was exposed to the atmosphere it cured to a tack-free state in 10 minutes. ⅛" thick sections were cast and cured overnight. After a full two-day cure time, this particular sample of rubber exhibited a tensile strength of 264 p.s.i. and elongation of 223%, a tear strength of 20 p.s.i. and a Shore A Hardness of 32. These properties did not significantly change after a 7-day period.

EXAMPLE IX

An OH-end-blocked fluid (200 grams) of 41,000 cps. viscosity was mixed with 200 grams of Minusil, 15 grams Cabosil-M7 (a fumed silica filler), 10.3 ml. of the end-blocker of Example V, and 0.5% of catalyst. The general procedure followed that of Example VIII. The material became tack-free in 15 minutes whereafter on test is showed a tensil strength of 605 p.s.i., a elongation of 180%, a tear strength of 46 p.s.i., and a Shore A Hardness of 55. After a 7-day cure period the tensil strength had changed 668 p.s.i., the elongation to 185%, the tear strength to 43 p.s.i., and the hardness to 58.

EXAMPLE X

In this experiment the procedure was exactly the same as in Example II, except that t-butanol was substituted for isopropanol, the effect being a slight increase in cure time to about 10 hours.

EXAMPLE XI

In the manner described in Example II, the following alcohols were utilized in the production of the corresponding alkoxytrioximosilanes:

$C_6H_{11}OH$
$Cl(CH_2)_4OH$
$CH_3CH_2CH_2CH_2O-CH_2CH_2OH$
$CH_3CH_2OCH_2CH_2OH$
$C_6H_5CH_2OH$
$CF_3CH_2CH_2OH$

What is claimed is:
1. An organopolysiloxane material conforming to the formula

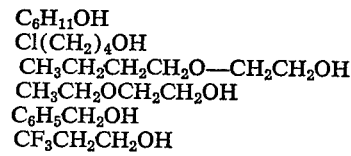

in which $n$ is an integer sufficient to yield a viscosity of from about 500 to about 500,000 centipoises, R is selected from the class consisting of monovalent hydrocarbon, halo-hydrocarbon and cyano-alkyl radicals, R' is H, aryl, alkyl or a halo-alkyl radical or not more than 4 carbon atoms and R" is a saturated or unsaturated monovalent hydrocarbon radical which may be halo- or cyano-substituted.

2. An organopolysiloxane material conforming to claim 1 where each R' is methyl.

3. An organopolysiloxane material conforming to claim 2 where each R" is isopropyl.

4. An organopolysiloxane material conforming to claim 2 where each R" is methyl.

5. An organopolysiloxane material conforming to claim 1 where $n$ has a value of between 5 and about 9,000.

6. An organopolysiloxane material conforming to claim 2 where R" is an alkyl group of not more than 4 carbon atoms.

7. A room temperature-vulcanizing composition comprising an organopolysiloxane conforming to the material of claim 1 and further comprising a filler material.

8. A composition conforming to claim 7 where said filler is present in an amount representing from about 5 to upwards of 100 parts by weight per 100 parts of the organopolysiloxane material.

9. A composition conforming to either of claims 7 or 9 which incorporates a substance adapted to hasten the curing of the composition.

10. A composition conforming to claim 9 where said substance is an organotin compound.

References Cited

UNITED STATES PATENTS 3,162,663  12/1964  Beck _____ 260—448.8
3,189,576  6/1965  Sweet _____ 260—448.2

MORRIS LIEBMAN, Primary Examiner

L. T. JACOBS, Assistant Examiner

U.S. Cl. X.R.

20—46.5

UNITED STATES PATENT OFFICE
CERTIFICATE OF CORRECTION

Patent No. 3,471,434　　　　　　　　　　　　　　　　October 7, 19

Kailash Chandra Pande et al.

It is certified that error appears in the above identified patent and that said Letters Patent are hereby corrected as shown below:

Column 6, Example 1, line 2, "hous" should read -- hours - Example V., line 74, "with" should read -- within --. Column 7, 1 29, "$Bu_2Sn(OME)_2$" should read -- $Bu_2Sn(OMe)_2$ --.

Signed and sealed this 23rd day of March 1971.

(SEAL)
Attest:

EDWARD M. FLETCHER, JR.　　　　　　　　　　　WILLIAM E. SCHUYLER,
Attesting Officer　　　　　　　　　　　　　　　Commissioner of Paten